(12) United States Patent
Fortin

(10) Patent No.: US 6,776,249 B2
(45) Date of Patent: Aug. 17, 2004

(54) INDUSTRIAL TRUCK STEERED BY A TILLER

(75) Inventor: Dominique Fortin, Montataire (FR)

(73) Assignee: Still & Saxby S.A.R.L. (FR)

( * ) Notice: Subject to any disclaimer, the term of this patent is extended or adjusted under 35 U.S.C. 154(b) by 21 days.

(21) Appl. No.: 10/165,409

(22) Filed: Jun. 7, 2002

(65) Prior Publication Data

US 2003/0057000 A1 Mar. 27, 2003

(30) Foreign Application Priority Data

Jun. 8, 2001 (DE) .......................................... 101 27 905

(51) Int. Cl.[7] .............................................. B62D 1/14
(52) U.S. Cl. ................................................... 180/19.3
(58) Field of Search .............................. 180/19.3, 19.1, 180/19.2, 65.1, 65.8, 332, 315

(56) References Cited

U.S. PATENT DOCUMENTS

| 2,645,297 A | * | 7/1953 | Wennberg et al. | .......... 180/19.2 |
| 3,738,441 A | * | 6/1973 | Kemner | ...................... 180/65.1 |
| 3,757,180 A | * | 9/1973 | Subler | ......................... 318/139 |
| 3,791,474 A | * | 2/1974 | Stammen et al. | ............ 180/332 |
| 5,860,485 A | * | 1/1999 | Ebbenga | ..................... 180/19.2 |
| 5,964,313 A | * | 10/1999 | Guy | ............................. 180/332 |
| 6,394,205 B1 | * | 5/2002 | Akuzawa | .................... 180/19.3 |
| 6,464,025 B1 | * | 10/2002 | Koeper et al. | .............. 180/19.2 |

FOREIGN PATENT DOCUMENTS

| DE | 44 08 775 A1 | 9/1995 | ........... B62D/51/04 |
| DE | 196 12 603 C1 | 10/1997 | ........... B62D/51/04 |

* cited by examiner

Primary Examiner—Lesley D. Morris
Assistant Examiner—Tony Winner
(74) Attorney, Agent, or Firm—Webb Ziesenheim Logsdon Orkin & Hanson, P.C.

(57) ABSTRACT

An industrial truck has a tiller that can pivot around a horizontal axis and a traction drive motor that can be controlled by an operator by a traction drive switch. The maximum speed of travel of the industrial truck can be set by an electrical control unit as a function of the pivot angle of the tiller. The maximum speed of the industrial truck is a function of the pivot angle of the tiller. At least one segment of the pivoting range of the tiller is provided with variable maximum speed, in which the maximum speed of travel varies continuously with the pivoting angle. The division of the pivoting range of the tiller into the segment with variable maximum speed and at least one additional segment is made by the control unit as a function of the signal of a continuous or incremental sensor.

25 Claims, 2 Drawing Sheets

INDUSTRIAL TRUCK STEERED BY A TILLER

CROSS-REFERENCE TO RELATED APPLICATION

This application claims priority to German Application No. DE 101 27 905.1, filed Jun. 8, 2001, and herein incorporated by reference in its entirety.

BACKGROUND OF THE INVENTION

1. Field of the Invention

This invention relates to an industrial truck with a tiller that can pivot around a horizontal axis and a traction drive motor that can be controlled by an operator by means of a traction drive switch, wherein the maximum speed of travel of the industrial truck can be set by means of an electrical control unit as a function of the pivot angle of the tiller.

2. Technical Considerations

Industrial trucks of the type described above are frequently in the form of electrically driven pallet trucks or high-lift trucks that are operated in the "walk-along" mode. A drive wheel on the industrial truck is connected with the tiller directly or indirectly, so that the industrial truck can be steered by rotating the tiller around a vertical axis.

To actuate the various functions of the industrial truck, in particular the traction drive, the tiller is pivoted downwardly, starting from an at least approximately vertical "off" position.

On known industrial trucks, the traction drive switches, which are generally located in the vicinity of the tiller head, are generally active only when the tiller is pivoted into a normal traction segment. When the tiller is above or below this normal traction segment in a braking segment, the traction drive motor cannot be operated and the industrial truck is braked automatically.

For example, DE 44 08 775 C2 describes a generic industrial truck in which the traction drive motor can be actuated when the tiller is outside the normal traction segment. Operation of the traction drive motor is thereby also possible when the tiller is approximately vertical, so that the operator can stand a very short distance from the industrial truck even when the traction drive motor is turned on. To avoid any excessive danger for the operator, the maximum speed of the industrial truck is reduced for traction operation with the tiller outside the normal traction segment. In the object of DE 44 08 775 C2, this reduction of the maximum speed occurs automatically, as soon as the tiller is pivoted upwardly beyond the normal traction segment.

In the object of DE 196 12 603 C1, the maximum speed of an industrial truck steered by a tiller can be reduced by actuating a special traction switch, whereby simultaneously travel becomes possible in those segments of the pivoting range of the tiller which form the braking segments when the special traction switch is not actuated.

In the two solutions described above, there are a normal value and a reduced value for the maximum speed of the industrial truck. When there is a transition from the normal value to the reduced value, this change in speed can result in a sudden and, therefore, undesirable deceleration of the industrial truck. In an analogous fashion, during the transition from the reduced value to the normal value, there is a sudden acceleration of the industrial truck, which can surprise the operator of the industrial truck and, thus, pose a hazard.

An object of the invention is, therefore, to provide an industrial truck of the general type described above but in which a sudden and jerky deceleration or acceleration as a result of a change of the maximum speed of travel can be avoided.

SUMMARY OF THE INVENTION

The invention teaches that this object can be achieved by making the maximum speed of travel of the industrial truck a function of the pivoting angle of the tiller. At least one segment of the pivoting range of the tiller can be provided with a variable maximum speed, in which the maximum speed of travel varies continuously with the pivoting angle. In the above-mentioned segment with variable maximum speed, the maximum speed can be continuously adjusted to the pivoting angle of the tiller. In one embodiment, the farther upward the tiller is pivoted, the more the maximum speed of travel is reduced. The change in the maximum speed, therefore, occurs continuously, so that there is no sudden or jerky acceleration or deceleration of the industrial truck. The continuous variation of the maximum speed of travel can thereby occur continuously or in small graduations.

In one configuration of the invention, the segment with variable maximum speed can be adjacent to an upper end of the pivoting range of the tiller. On the upper end of this segment, the maximum speed can be at least approximately zero, and increases continuously during a downward pivoting of the tiller. Traction operation is thereby possible, although at very low speed, even when the tiller is in an almost vertical extreme position.

It is, likewise, possible that the segment with variable maximum speed is adjacent on an upper end to an upper braking segment, whereby when the tiller is in the upper braking segment, a braking device of the industrial truck is actuated automatically. Between the segment with variable maximum speed and the extreme vertical position of the tiller, there is, therefore, an upper braking segment in which no traction operation is possible. The safety of the industrial truck can thereby be increased with respect to the configuration described above which does not have an upper braking segment. Compared to a generic industrial truck of the prior art, however, the upper braking segment can be made smaller, because the adjacent segment with variable maximum speed offers an additional safety margin.

On the other end of the pivoting range of the tiller, in which the tiller is at least approximately horizontal, the segment with variable maximum speed can be adjacent, in accordance with a first embodiment of the invention, to a lower end of the pivoting range of the tiller.

In a second embodiment, the segment with variable maximum speed can be adjacent on a lower end to a lower braking segment, whereby when the tiller is in the lower braking segment, a braking device of the industrial truck is actuated automatically.

It is further possible for the segment with variable maximum speed to be adjacent, e.g., on an upper end, to a normal traction segment, whereby when the tiller is in the normal traction segment, the maximum speed of travel is set to a constant maximum value. In the normal traction range, therefore, basically the maximum speed of travel that can be allowably achieved as a result of the design of the industrial truck is available and is not changed even by pivoting the tiller inside the normal traction segment.

In one advantageous embodiment of the invention, the pivot angle of the tiller is detected at least in the segment with variable maximum speed by means of at least one continuous or incremental sensor. The sensor can be connected on the output side with the electrical control unit of the industrial truck which automatically sets the maximum speed corresponding to the current angle of the tiller. To achieve a redundant signal, two sensors that are independent of each other can be provided, for example two potentiometers or one potentiometer and one incremental sensor.

In one particularly simple and flexible arrangement, the pivoting angle inside the normal traction segment can be detected by means of the same continuous or incremental sensor. The same sensor is, therefore, used for the segment with variable maximum speed and the normal traction segment.

It is, likewise, advantageous if the pivot angle is detected in at least one braking segment by means of the same continuous or incremental sensor as in the segment with variable maximum speed, and in the normal traction segment as necessary.

It is particularly advantageous if the division of the pivoting range of the tiller into the segment with variable maximum speed and at least one additional segment by means of the control unit is made exclusively as a function of the signal of the at least one continuous or incremental sensor. The division of the pivoting range of the tiller into different segments can be made in the control unit by corresponding software programming. In particular, there are no additional switching elements that signal the transition between two segments of the pivoting range. The positions and sizes of the different segments of the pivoting range can thereby be adapted individually to certain vehicle equipment, varieties of use, or the customer's requirements without the need for hardware adaptations.

The safety of the industrial truck can be further improved if the maximum traction acceleration can be varied as a function of the pivoting angle of the tiller, preferably in the segment with variable maximum speed. The traction acceleration can be reduced for tiller positions in which the driver is particularly close to the industrial truck, for example, to further reduce the risk of erroneous or unintentional operation.

BRIEF DESCRIPTION OF THE DRAWINGS

Additional advantages and details of the invention are explained in greater detail below with reference to the exemplary embodiments illustrated in the accompanying schematic figures, in which.

DESCRIPTION OF THE PREFERRED EMBODIMENTS

Figure 1:
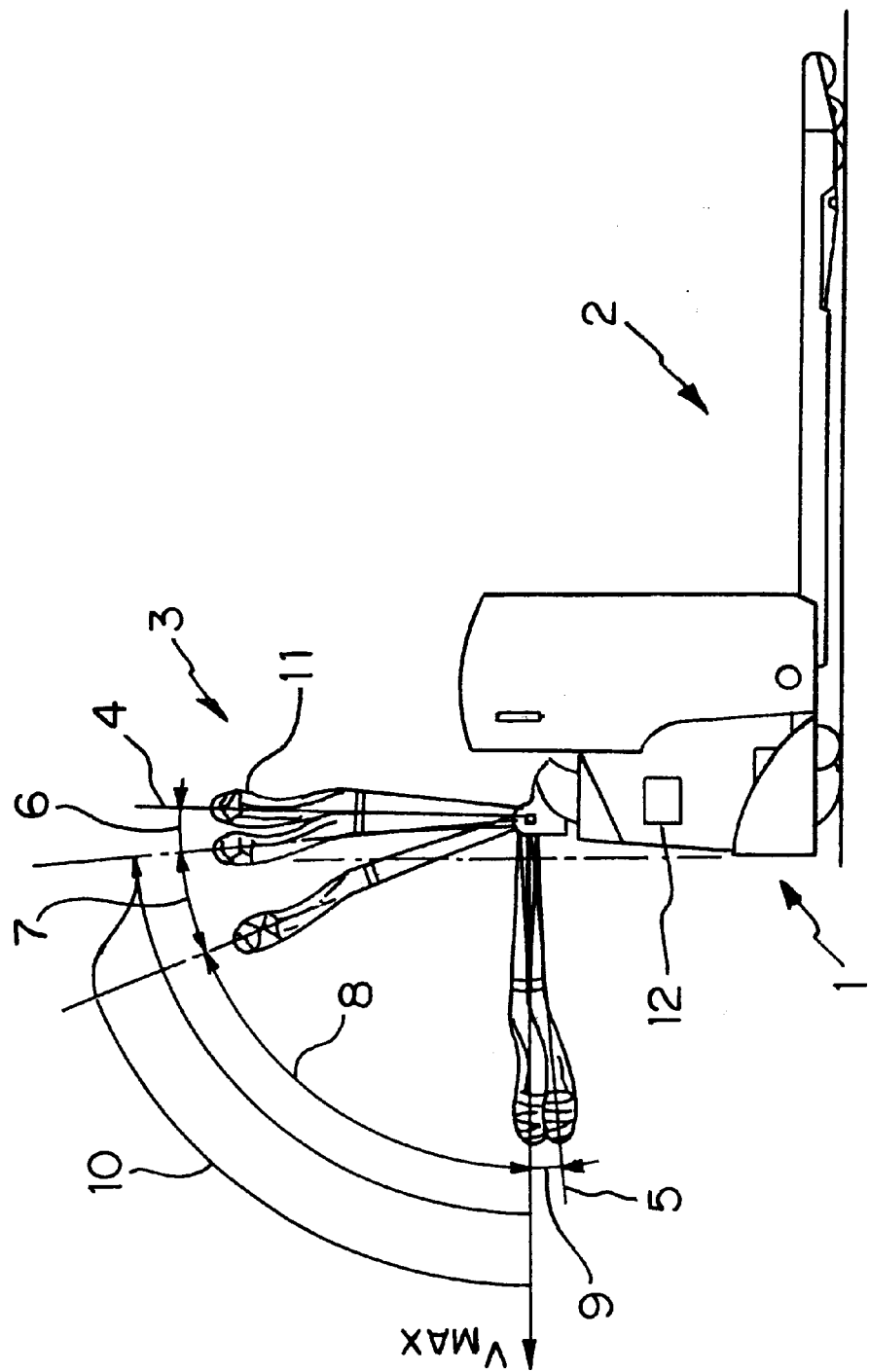
FIG. 1 shows an industrial truck of the invention with a segment with variable maximum speed and a normal traction segment.

FIG. 1 shows, as an example of an industrial truck of the invention, a pallet truck with a drive part 1 and a load part 2 which can be raised relative to the drive part 1. Located on the drive part 1 is a tiller 3 which, starting from its almost vertical rest position 4, can be pivoted downwardly by an operator. In the lower extreme position 5 the tiller 3 is approximately horizontal with respect to the surface on which the truck is resting. The tiller 3 can pivot around a horizontal axis and a traction motor of the truck can be controlled by an operator by a traction drive switch 11. As described below, the maximum speed of travel of the truck can be set by an electrical control unit 12 as a function of the pivot angle of the tiller 3.

The pivoting range of the tiller 3 in the embodiment illustrated in FIG. 1 is divided into the following segments: an upper braking segment 6, a segment 7 with variable maximum speed, a normal traction segment 8, and a lower braking segment 9. If the tiller 3 is in one of the two braking segments 6 or 9, the traction drive of the industrial truck is automatically turned off and the brakes of the industrial truck are actuated. Traction operation of the industrial truck is possible in the segment 7 and in the normal traction segment 8. The maximum achievable top speed, which is set by a control device (e.g., the control unit 12) of the industrial truck as a function of the position of the tiller 3, is shown as a curve 10 over the angle of the tiller 3. The invention teaches that in the segment 6, the maximum speed is set as a function of the tiller angle. In this case, the maximum speed increases during the downward pivoting movement of the tiller 3 continuously from zero to the maximum speed provided for the normal traction range 10. For the normal traction range, a constant maximum speed is set. For the division between the segment 7 and the normal traction segment 8, no mechanical switching elements are required. Rather, this division can be made simply by evaluating the tiller angle which is continuously measured in the electrical control unit 12.

Figure 2:
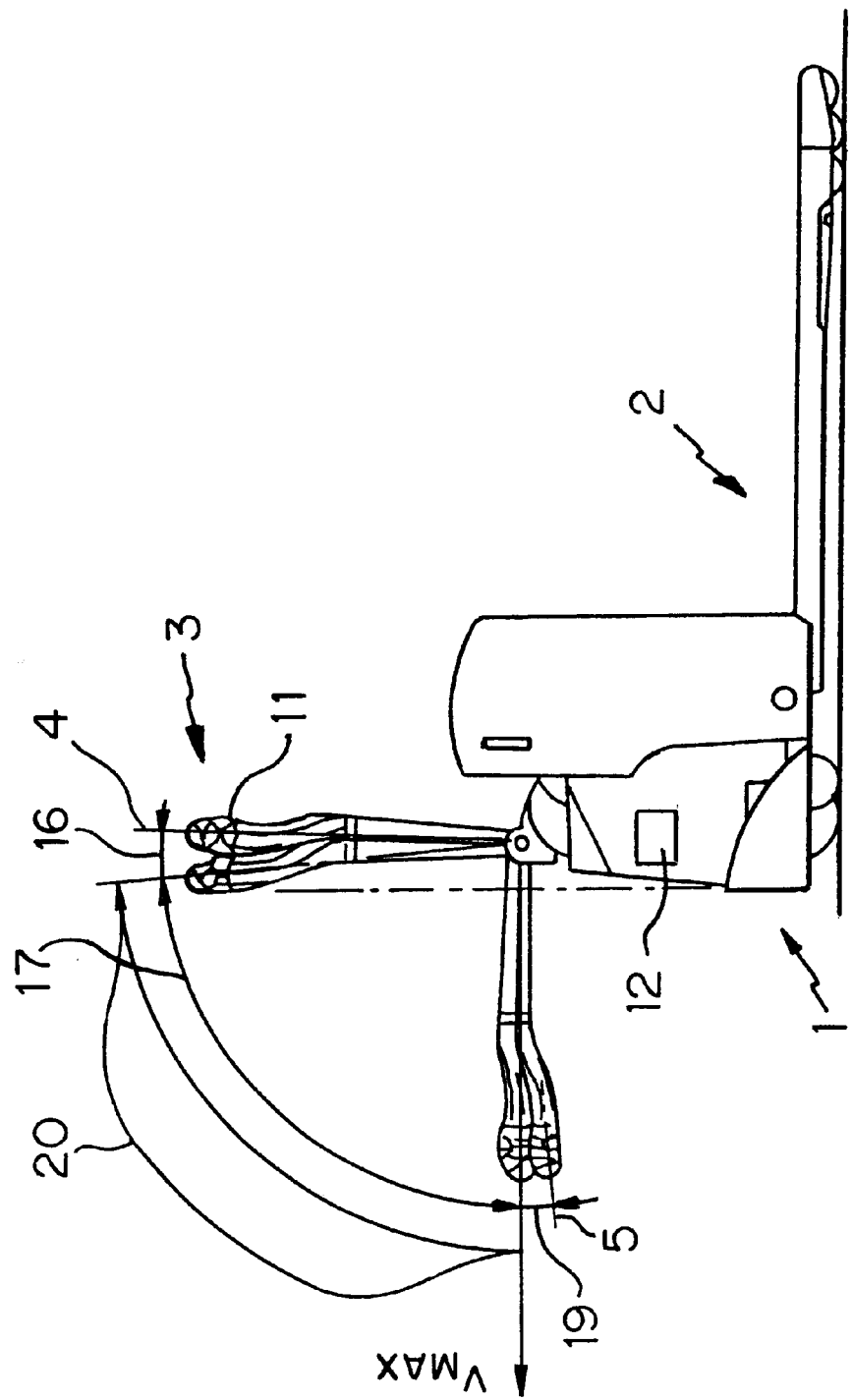
FIG. 2 shows an industrial truck of the invention with a large segment with variable maximum speed without a normal traction segment.

In the embodiment of the invention illustrated in FIG. 2, instead of the normal traction segment in which the tiller 3 is generally located during normal traction operation, there is a large segment 17 with variable maximum speed. Upwardly adjacent to this segment 17 is an upper braking segment 16, and downwardly adjacent a lower braking segment 19. The curve of the maximum speed is plotted by the curve 20 over the tiller angle. The system of the invention makes possible the free programming of the maximum speed as a function of the tiller angle. The curve of the maximum speed can, therefore, be easily adapted to special applications, customer requests, or country-specific safety standards.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An industrial truck, comprising:
   a tiller pivotable around a horizontal axis; and
   a traction drive motor controlled by an operator by a traction drive switch, wherein a maximum speed of travel of the industrial truck is set by an electrical control unit as a function of a pivoting angle of the tiller,
   wherein the maximum speed of travel of the industrial truck is a function of the pivoting angle of the tiller,
   wherein there is at least one segment of a pivoting range of the tiller with variable maximum speed, in which segment the maximum speed of travel varies continuously with the pivoting angle, and
   wherein the segment with variable maximum speed is adjacent on a lower end to a lower braking segment, wherein when the tiller is in the lower braking segment, a braking device of the industrial truck is actuated automatically.

2. An industrial truck, comprising:
a tiller pivotable around a horizontal axis; and
a traction drive motor controlled by an operator by a traction drive switch, wherein a maximum speed of travel of the industrial truck is set by an electrical control unit as a function of a pivoting angle of the tiller,
wherein the maximum speed of travel of the industrial truck is a function of the pivoting angle of the tiller,
wherein there is at least one segment of a pivoting range of the tiller with variable maximum speed, in which segment the maximum speed of travel varies continuously with the pivoting angle, and
wherein the segment with variable maximum speed is adjacent to an upper end of the pivoting range of the tiller.

3. The industrial truck as claimed in claim 2, wherein the segment with variable maximum speed is adjacent to a lower end of the pivoting range of the tiller.

4. The industrial truck as claimed in claim 3, wherein the pivoting angle of the tiller, at least in the segment with variable maximum speed, is detected by at least one continuous or incremental sensor.

5. The industrial truck as claimed in claim 2, wherein the segment with variable maximum speed is adjacent on a lower end to a lower braking segment, wherein when the tiller is in the lower braking segment, a braking device of the industrial truck is actuated automatically.

6. The industrial truck as claimed in claim 2, wherein the segment with variable maximum speed is adjacent on a lower end to a normal traction segment, wherein when the tiller is in the normal traction segment, the maximum speed of travel is set to a constant maximum value.

7. The industrial truck as claimed in claim 2, wherein the pivoting angle of the tiller, at least in the segment with variable maximum speed, is detected by at least one continuous or incremental sensor.

8. An industrial truck, comprising:
a tiller pivotable around a horizontal axis; and
a traction drive motor controlled by an operator by a traction drive switch, wherein a maximum speed of travel of the industrial truck is set by an electrical control unit as a function of a pivoting angle of the tiller,
wherein the maximum speed of travel of the industrial truck is a function of the pivoting angle of the tiller,
wherein there is at least one segment of a pivoting range of the tiller with variable maximum speed, in which segment the maximum speed of travel varies continuously with the pivoting angle, and
wherein the segment with variable maximum speed is adjacent on a lower end to a normal traction segment, wherein when the tiller is in the normal traction segment, the maximum speed of travel is set to a constant maximum value.

9. An industrial truck, comprising:
a tiller pivotable around a horizontal axis; and
a traction drive motor controlled by an operator by a traction drive switch, wherein a maximum speed of travel of the industrial truck is set by an electrical control unit as a function of a pivoting angle of the tiller,
wherein the maximum speed of travel of the industrial truck is a function of the pivoting an angle of the tiller,
wherein there is at least one segment of a pivoting range of the tiller with variable maximum speed, in which segment the maximum speed of travel varies continuously with the pivoting angle, and
wherein the segment with variable maximum speed is adjacent to a lower end of the pivoting range of the tiller.

10. The industrial truck as claimed in claim 9, wherein the pivoting angle of the tiller, at least in the segment with variable maximum speed, is detected by at least one continuous or incremental sensor.

11. An industrial truck, comprising:
a tiller pivotable around a horizontal axis; and
a traction drive motor controlled by an operator by a traction drive switch, wherein a maximum speed of travel of the industrial truck is set by an electrical control unit as a function of a pivoting angle of the tiller,
wherein the maximum speed of travel of the industrial truck is a function of the pivoting angle of the tiller,
wherein there is at least one segment of a pivoting range of the tiller with variable maximum speed, in which segment the maximum speed of travel varies continuously with the pivoting angle, and
wherein the segment with variable maximum speed is adjacent on an upper end to an upper braking segment, wherein when the tiller is in the upper braking segment, a braking device of the industrial truck is actuated automatically.

12. The industrial truck as claimed in claim 11, wherein the segment with variable maximum speed is adjacent to a lower end of the pivoting range of the tiller.

13. The industrial truck as claimed in claim 12, wherein the pivoting angle of the tiller, at least in the segment with variable maximum speed, is detected by at least one continuous or incremental sensor.

14. The industrial truck as claimed in claim 11, wherein the segment with variable maximum speed is adjacent on a lower end to a lower braking segment, wherein when the tiller is in the lower braking segment, a braking device of the industrial truck is actuated automatically.

15. The industrial truck as claimed in claim 11, wherein the segment with variable maximum speed is adjacent on a lower end to a normal traction segment, wherein when the tiller is in the normal traction segment, the maximum speed of travel is set to a constant maximum value.

16. The industrial truck as claimed in claim 11, wherein the pivoting angle of the tiller, at least in the segment with variable maximum speed, is detected by at least one continuous or incremental sensor.

17. An industrial truck, comprising:
a tiller pivotable around a horizontal axis; and
a traction drive motor controlled by an operator by a traction drive switch, wherein a maximum speed of travel of the industrial truck is set by an electrical control unit as a function of a pivoting angle of the tiller,
wherein the maximum speed of travel of the industrial truck is a function of the pivoting angle of the tiller,
wherein there is at least one segment of a pivoting range of the tiller with variable maximum speed, in which segment the maximum speed of travel varies continuously with the pivoting angle,
wherein the pivoting angle of the tiller, at least in the segment with variable maximum speed, is detected by at least one continuous or incremental sensor, and wherein the pivot angle is detected in a normal traction segment by the same continuous or incremental sensor.

18. The industrial truck as claimed in claim 17, wherein the pivot angle is detected in at least one braking segment by the same continuous or incremental sensor.

19. The industrial truck as claimed in claim 17, wherein a division of the pivoting range of the tiller into the segment with variable maximum speed and at least one additional segment is made by the control unit exclusively as a function of a signal of the at least one continuous or incremental sensor.

20. The industrial truck as claimed in claim 17, wherein in the section with variable maximum speed, a maximum traction acceleration is varied as a function of the pivot angle of the tiller.

21. An industrial truck, comprising:
- a tiller pivotable around a horizontal axis; and
- a traction drive motor controlled by an operator by a traction drive switch, wherein a maximum speed of travel of the industrial truck is set by an electrical control unit as a function of a pivoting angle of the tiller,
- wherein the maximum speed of travel of the industrial truck is a function of the pivoting angle of the tiller,
- wherein there is at least one segment of a pivoting range of the tiller with variable maximum speed, in which segment the maximum speed of travel varies continuously with the pivoting angle,
- wherein the pivoting angle of the tiller, at least in the segment with variable maximum speed, is detected by at least one continuous or incremental sensor, and
- wherein a division of the pivoting range of the tiller into the segment with variable maximum speed and at least one additional segment is made by the control unit exclusively as a function of a signal of the at least one continuous or incremental sensor.

22. The industrial truck as claimed in claim 21, wherein in the section with variable maximum speed, a maximum traction acceleration is varied as a function of the pivot angle of the tiller.

23. The industrial truck as claimed in claim 21, wherein in the section with variable maximum speed, a maximum traction acceleration is varied as a function of the pivot angle of the tiller.

24. An industrial truck, comprising:
- a tiller pivotable around a horizontal axis; and
- a traction drive motor controlled by an operator by a traction drive switch, wherein a maximum speed of travel of the industrial truck is set by an electrical control unit as a function of a pivoting angle of the tiller,
- wherein the maximum speed of travel of the industrial truck is a function of the pivoting angle of the tiller,
- wherein there is at least one segment of a pivoting range of the tiller with variable maximum speed, in which segment the maximum speed of travel varies continuously with the pivoting angle,
- wherein the pivot angle is detected in at least one braking segment by the same continuous or incremental sensor, and
- wherein a division of the pivoting range of the tiller into the segment with variable maximum speed and at least one additional segment is made by the control unit exclusively as a function of a signal of the at least one continuous or incremental sensor.

25. The industrial truck as claimed in claim 24, wherein in the section with variable maximum speed, a maximum traction acceleration is varied as a function of the pivot angle of the tiller.

* * * * *

UNITED STATES PATENT AND TRADEMARK OFFICE
CERTIFICATE OF CORRECTION

PATENT NO. : 6,776,249 B2 Page 1 of 1
DATED : August 17, 2004
INVENTOR(S) : Fortin It is certified that error appears in the above-identified patent and that said Letters Patent is hereby corrected as shown below:

Column 8,
Lines 1-4, delete claim 22.

Signed and Sealed this

Fifteenth Day of November, 2005

JON W. DUDAS
*Director of the United States Patent and Trademark Office*